(12) United States Patent
Malin (10) Patent No.: US 10,697,516 B2
(45) Date of Patent: Jun. 30, 2020

(54) BRACKET DEVICE AND METHOD

(71) Applicant: Allied Bolt, Inc., Lake Success, NY (US)

(72) Inventor: Glen K. Malin, Lake Success, NY (US)

(73) Assignee: Allied Bolt, Inc., Lake Success, NY (US)

( * ) Notice: Subject to any disclaimer, the term of this patent is extended or adjusted under 35 U.S.C. 154(b) by 0 days.

(21) Appl. No.: 16/023,385

(22) Filed: Jun. 29, 2018

(65) Prior Publication Data

US 2020/0003274 A1    Jan. 2, 2020

(51) Int. Cl.
*F16G 11/14* (2006.01)
*F16M 13/02* (2006.01)
*F16G 11/04* (2006.01)

(52) U.S. Cl.
CPC .......... *F16G 11/14* (2013.01); *F16M 13/02* (2013.01); *F16G 11/048* (2013.01)

(58) Field of Classification Search
CPC ........ F16G 11/14; F16G 11/048; F16M 13/02
USPC ......... 248/63, 218.4, 219.2, 219.4; 24/598.2, 24/598.8
See application file for complete search history.

(56) References Cited

U.S. PATENT DOCUMENTS

| | | | | |
|---|---|---|---|---|
| 39,239 A * | 7/1863 | Packer | ...................... | F16G 15/02 59/85 |
| 923,722 A * | 6/1909 | smith | ...................... | F16B 45/00 24/598.8 |
| 1,447,064 A * | 2/1923 | Cousins | ................... | B21L 15/00 59/35.1 |
| 1,454,335 A * | 5/1923 | Prendergast | ............ | F16G 15/02 59/85 |
| 1,594,970 A * | 8/1926 | Matthes | .................... | B60M 1/23 191/40 |
| 1,684,784 A * | 9/1928 | Weller | .................... | H02G 7/053 24/135 N |
| 2,041,613 A * | 5/1936 | Lincks | ................. | H01H 1/5855 24/569 |
| 2,058,258 A * | 10/1936 | Preiswerk | .............. | H02G 7/053 248/63 |
| 2,775,422 A * | 12/1956 | Von Herbulis | ......... | H02G 7/053 24/134 R |
| 3,292,401 A * | 12/1966 | Van Meter | ............. | A44B 15/00 70/459 |
| 4,461,059 A * | 7/1984 | Bury | ........................ | F16B 2/22 24/115 R |

(Continued)

*Primary Examiner* — Kimberly T Wood
(74) *Attorney, Agent, or Firm* — Baker Botts L.L.P.

(57) ABSTRACT

A bracket device to secure a tail wire of a drop wire clamp to a structure including a base having a surface. The bracket device further includes a retention hook having a first end, a second end, and retention region defined between the first end and second end. The first end of the retention hook is coupled to the base surface, and the second end of the retention hook is disposed at a predetermined distance from the base surface to define a gap therebetween having a width. The bracket device further includes a locking nut that is cooperatively coupled to the second end of the retention hook and adapted to move between an unlocked position to permit a wire to enter the retention region and a locked position in which a wire is retained by the retention hook in the retention region by a reduction of the gap width.

20 Claims, 6 Drawing Sheets

(56) References Cited

U.S. PATENT DOCUMENTS

| | | | | |
|---|---|---|---|---|
| 4,466,589 A * | 8/1984 | Leonardo | ............... | H02G 7/08 |
| | | | | 248/61 |
| 4,477,948 A * | 10/1984 | Sachs | ..................... | H02G 7/056 |
| | | | | 24/115 K |
| 4,939,821 A * | 7/1990 | Frank, Jr. | ............... | H02G 7/056 |
| | | | | 24/115 M |
| 5,322,132 A * | 6/1994 | Franks, Jr. | ............. | H02G 7/056 |
| | | | | 174/41 |
| 6,152,419 A * | 11/2000 | Bender | .................. | E05B 69/00 |
| | | | | 211/4 |
| 6,581,251 B2 * | 6/2003 | Malin | .................... | H02G 7/056 |
| | | | | 174/79 |
| 6,648,279 B1 * | 11/2003 | Malin | .................... | H02G 7/053 |
| | | | | 174/44 |
| 8,186,024 B2 * | 5/2012 | Hatsios | .................. | E01D 19/16 |
| | | | | 24/457 |
| 8,517,317 B2 | 8/2013 | Malin | | |
| 8,556,223 B2 * | 10/2013 | Balfour | .................... | H02G 7/04 |
| | | | | 174/40 R |
| 9,935,447 B2 * | 4/2018 | Malin | .................... | H02G 7/053 |
| 2014/0008380 A1 * | 1/2014 | Zou | ....................... | F16M 13/02 |
| | | | | 220/752 |

\* cited by examiner

BRACKET DEVICE AND METHOD

BACKGROUND

Field of the Disclosed Subject Matter

The presently disclosed subject matter relates generally to devices and methods to secure a wire to a structure.

Description of the Related Art

Bracket devices are commonly used in conjunction with drop wire clamps to secure telecommunication wires and the like to both round and flat structures. For example, such devices can be used to secure telephone cables, television cables, network cables, fiber optic cables, and the like to buildings, utility poles, or other structures. Often bracket devices are used to secure wires at an intermediate portion thereof to a point on a structure. For example, bracket devices are commonly used to secure a wire or wires to the outside of buildings at a point just short of the position in which the wires enter the building.

Bracket devices to secure wires to structures are known in the art. Some bracket devices are designed to cooperate with clamps, such as drop wire clamps disclosed in U.S. Pat. Nos. 8,517,317 and 6,581,251, the disclosures of which are herein incorporated by reference in their entireties. Some known bracket devices, however, have deficiencies. For example, light-weight and springy wires, such as a fiber-optic wires can be dislodged from traditional bracket devices such as hooks due to wind whipping or other forces. Additionally, some wires tend to resist bending and may act as springs when subjected to various loads and bending. This springing action of the wire can cause the wire to jump out of a bracket device that secured the wire to a structure. Furthermore, installation of some bracket devices can be difficult.

Accordingly, there exists a need for an improved bracket device that overcomes at least the above-identified issues.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages, and in accordance with the purpose of the disclosed subject matter, as embodied and broadly described, the disclosed subject matter includes a bracket device to secure a tail wire of a drop wire clamp to a structure. The bracket device generally includes a base having a surface. The bracket device further includes a retention hook having a first end, a second end, and a retention region defined between the first end and the second end. The first end of the retention hook is coupled to the base surface, and the second end of the retention hook is disposed at a predetermined distance from the base surface to define a gap therebetween having a width. The bracket device further includes a locking nut that is cooperatively coupled to the second end of the retention hook and adapted to move between an unlocked position to permit a wire to enter the retention region and a locked position in which a wire is retained by the retention hook in the retention region by a reduction of the gap width.

According to a further aspect of the disclosed subject matter, a method for securing a tail wire of a drop wire clamp to a structure with a bracket device as described above is provided. The method includes attaching the bracket device to a structure and cooperatively coupling a locking nut to the second end of the retention hook in an unlocked position. The method further includes inserting a wire having a gauge into the retention region with the locking nut in the unlocked position and then transitioning the locking nut from the unlocked position to the locked position. Transitioning the locking nut to the locked position retains the wire in the retention region since the width of the gap is less than the gauge of the wire when the locking nut is in the locked position.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the containers and methods of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The apparatus and methods presented herein can be used for securing a wide variety of wires to a structure. The disclosed subject matter is particularly suited for securing utility wires, including fiber optic wires, to structures such as buildings. The securement can be at a point just short of the position in which the wire enters the building.

The bracket devices and methods for securing wires to structures of the disclosed subject matter have demonstrated desired performance characteristics not achieved by conventional bracket devices. For purpose of understanding, and not limitation, bracket devices of the disclosed subject matter can prevent lightweight wires, such as fiber-optic wires, from coming unsecured or unattached from a structure. Such lightweight wires can be more likely to be dislodged from traditional bracket devices due to wind and other loads acting over the length of the wire and causing the wire to become dislodged from the bracket device. When the locking nut of bracket devices in accordance with the disclosed subject matter is moved to the locked position, a reduction of the gap disclosed herein retains the wire in the retention region and prevents the wire from becoming dislodged. In accordance with the disclosed subject matter herein, the bracket device generally includes a base having a surface. The bracket device further includes a retention hook having a first end, a second end, and a retention region defined between the first end and the second end. The first end of the retention hook is coupled to the base surface, and the second end of the retention hook is disposed at a predetermined distance from the base surface to define a gap therebetween having a width. The bracket device further includes a locking nut that is cooperatively coupled to the second end of the retention hook and adapted to move between an unlocked position to permit a wire to enter the retention region and a locked position in which a wire is retained by the retention hook in the retention region by a reduction of the gap width.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the bracket device in accordance with the disclosed subject matter are shown in FIGS. 1-6. The bracket device of the disclosed subject matter is suitable for securing a wide range of wires to various structures.

Figure 1:
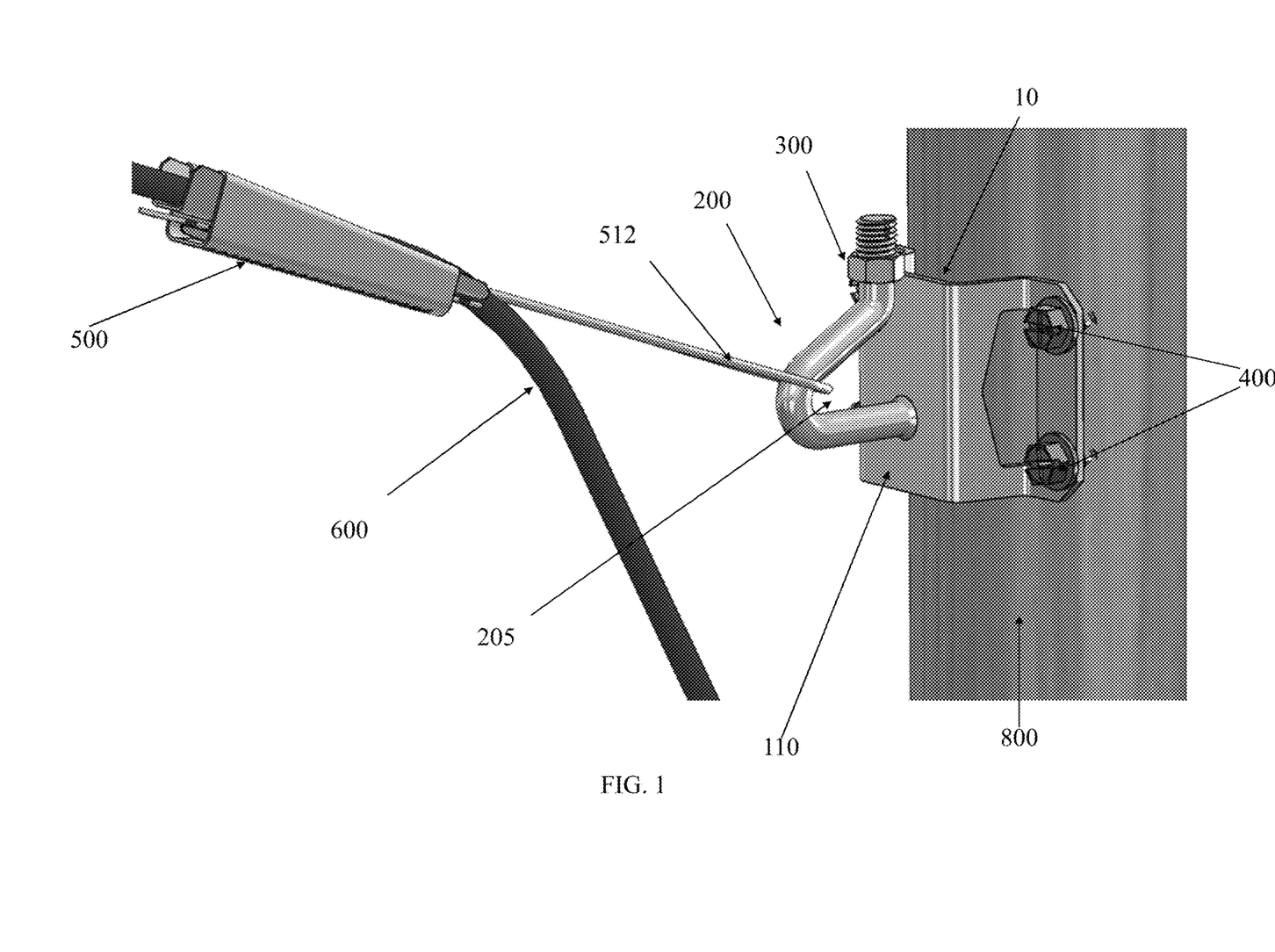
FIG. 1 is a perspective view of an exemplary embodiment of a bracket device in accordance with the disclosed subject matter that is secured to a structure with a bail wire of a drop wire clamp retained by the retention hook.
Figure 2:
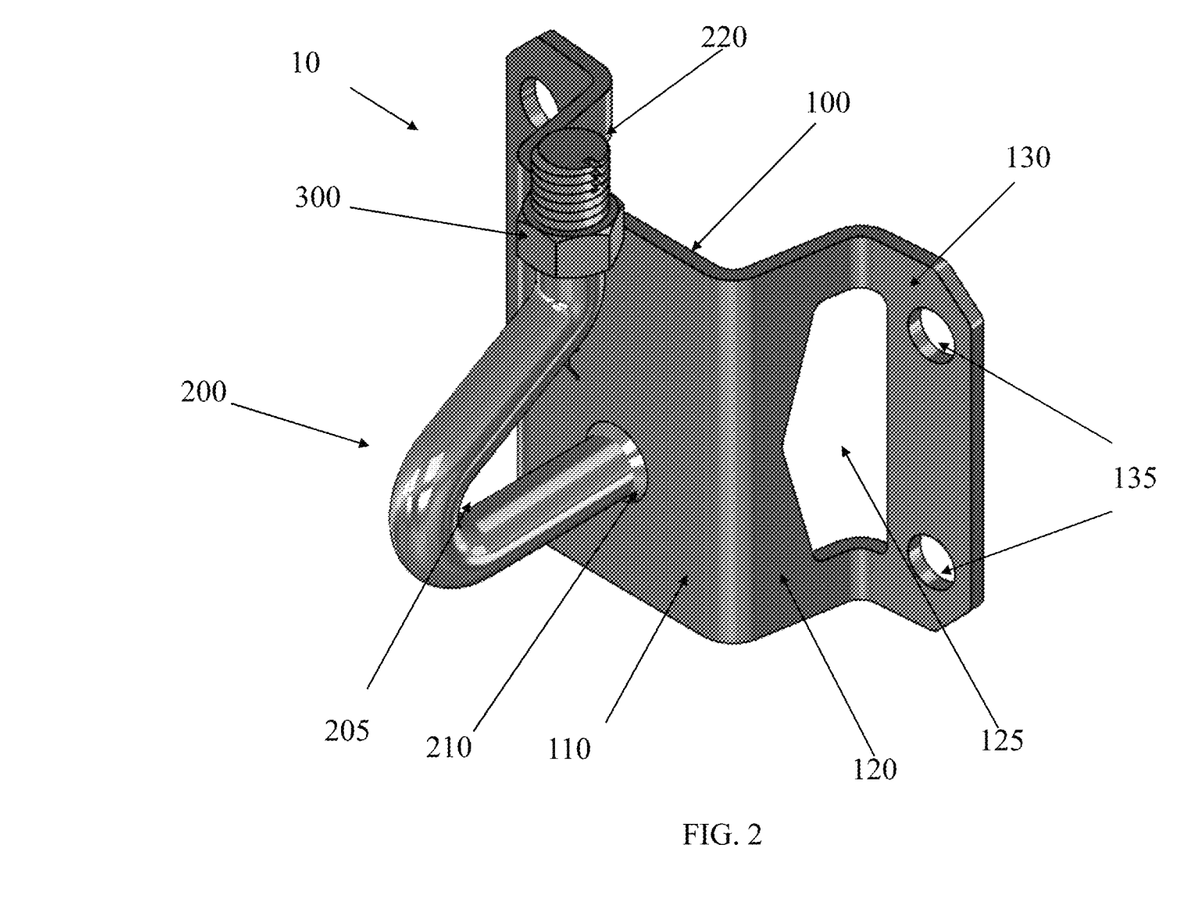
FIG. 2 is a front perspective view of the bracket device of FIG. 1.
Figure 3:
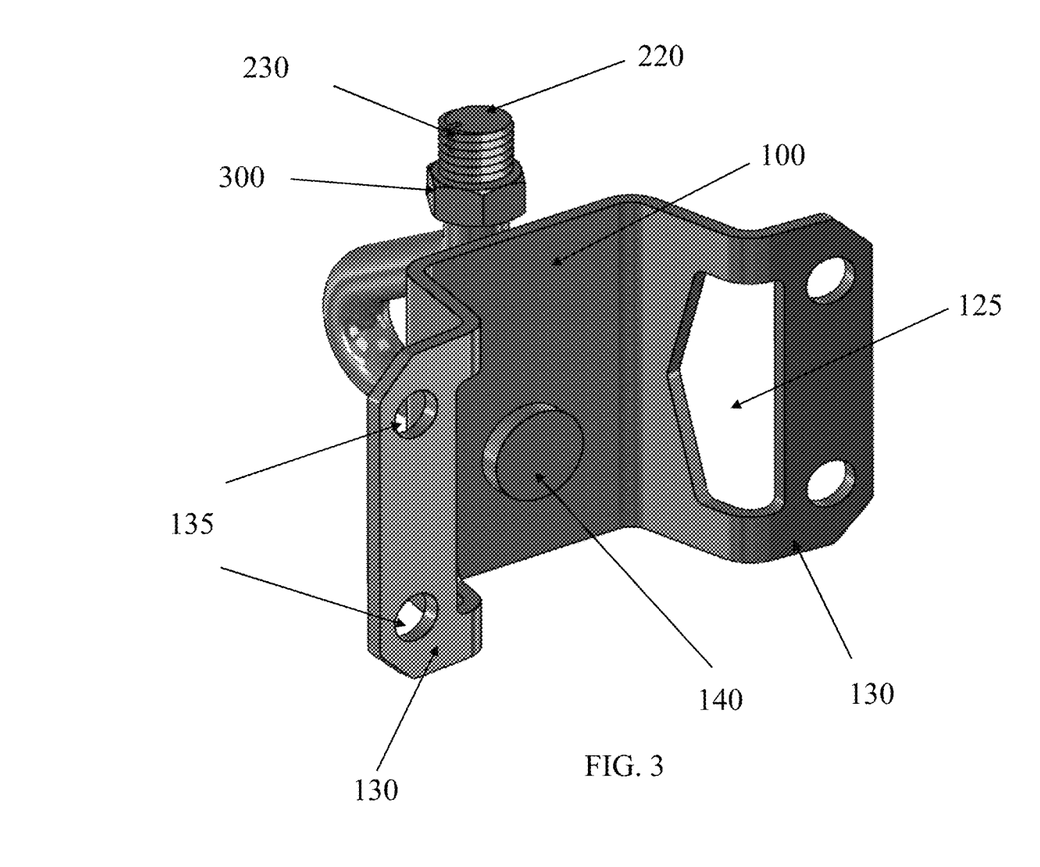
FIG. 3 is a rear perspective view of the bracket device of FIG. 1.
Figure 6:
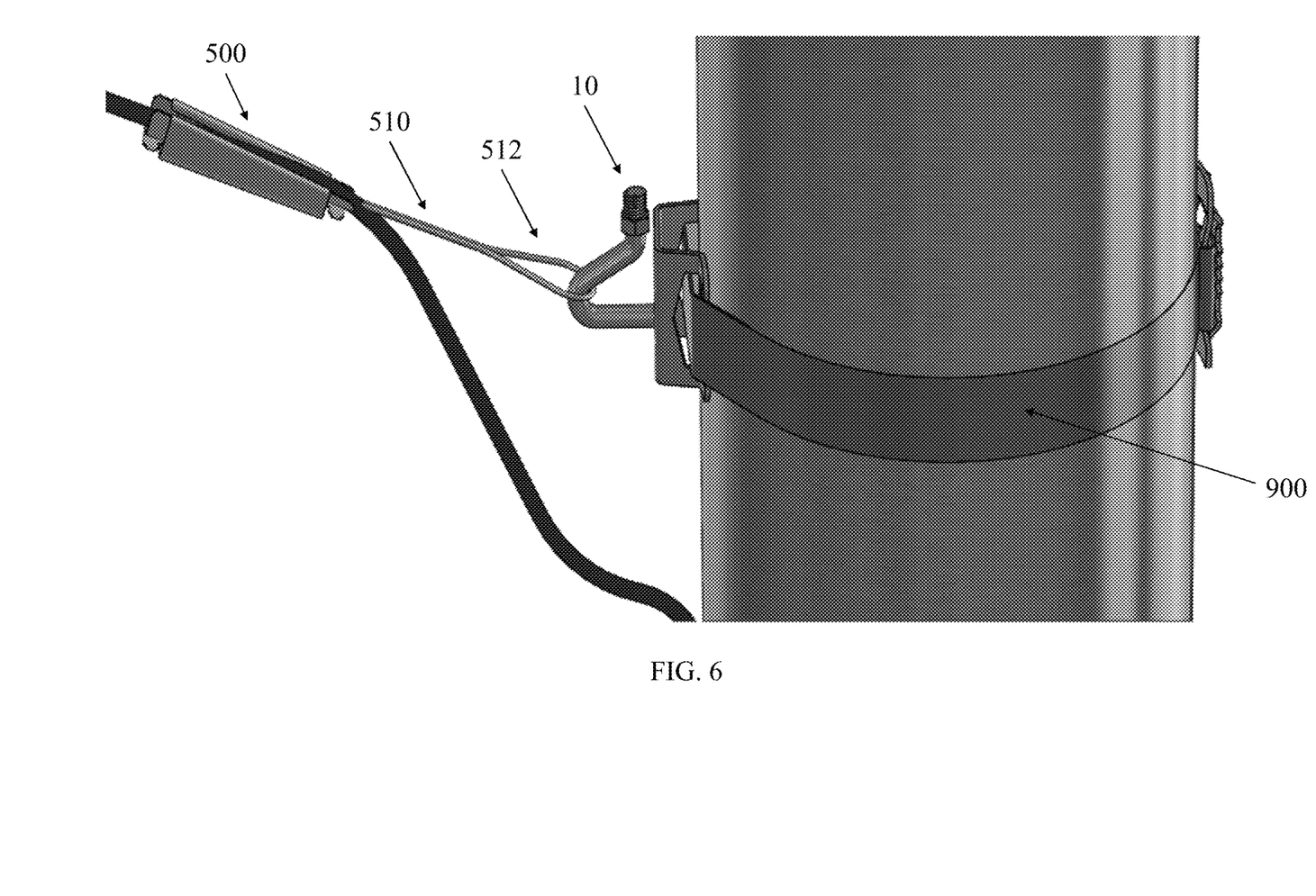
FIG. 6 is a side perspective view of the bracket device of FIG. 1 depicted secured to a structure with an alternative exemplary fastener with a bail wire of a drop wire clamp retained by the retention hook.

For purpose of illustration, and not limitation, reference is made to the exemplary embodiment of a bracket device 10 shown in FIGS. 1-6. As shown in FIGS. 1 and 2, the bracket device 10 generally includes a base 100 with a surface 110. As embodied herein, the base 100 can further include one or more features to secure the bracket device 10 to a structure. For purpose of example, and not limitation, the base 100 can define at least one aperture or hole 135 to receive an implement 400, such as a screw, nail, anchor, rivet, or a bolt to secure the base to a structure. For purpose of example and not limitation, and as embodied herein, the base has four holes 135 as shown in FIG. 3. The base 100 can be any suitable shape. For purpose of example and not limitation, and as embodied herein, the base 100 can have a generally U shape in a top view with opposing legs 120 extending from opposing sides of the surface 110, as best shown in FIG. 5B discussed herein. The legs 120 can arranged with the base 100 at any suitable angle as discussed below. Opposing legs 120 can further define holes such as slots 125 therein, which can be configured to receive one or more fasteners to secure the base to the structure. For purpose of example, and not limitation, a fastener 900 such as a band, a strap, a cable tie, or the like, can be passed through slots 125 in opposing legs 120 and around a structure to secure the bracket device 10, as best shown in FIG. 6 discussed herein. As further embodied herein, and in accordance with the disclosed subject matter, the base 100 can further include flanges 130 extending from the opposing legs 120. The flanges 130 can be arranged with the legs 120 at any suitable angle that is complementary with the structure to which the device 10 is fastened as discussed below. Holes 135 can be defined in flanges 130 or along an interface between the legs and flanges to accept implements 400 to secure the device 10 to a structure. Additionally, or alternatively, and in accordance with the disclosed subject matter, holes 135 can be defined in the surface 110 of the base, or any other suitable location to secure the bracket device 10 to a structure.

As embodied herein, the size and orientation of the base 100, including surface 110, opposing legs 120, and flanges 130 can be selected to facilitate securing the bracket device 10 to the desired structure and to accommodate the necessary weight and/or tension of the wire to be retained. For purpose of example and not limitation, and as embodied herein, opposing legs 120 and flanges 130 can be angled relative to one another to facilitate securing the bracket device 10 to the outer perimeter of a curved structure. Additionally, or alternatively, and in accordance with the disclosed subject matter, the size and orientation of surface 110 and/or the opposing legs 120 and flanges 130 if present can be selected to facilitate securing the bracket device 10 to a generally flat structure or an angled structure as desired.

In accordance with the disclosed subject matter, and as discussed further herein, the base 100 can be made of any suitable material and made using any suitable method of manufacture. For purpose of example, and as embodied herein, the base 100 can be made from galvanized steel amongst other materials and can have a thickness dimension of between approximately 50 mil and approximately 150 mil. Furthermore, the base can have a height dimension of between approximately 1 inch and 5 inches and a width dimension between approximately 1 inch and approximately 5 inches. As will be understood by those of skill in the art, the material of the base 100 and dimensions of the base 100 can be selected to achieve the desired performance of the bracket device 10.

Figure 4A:
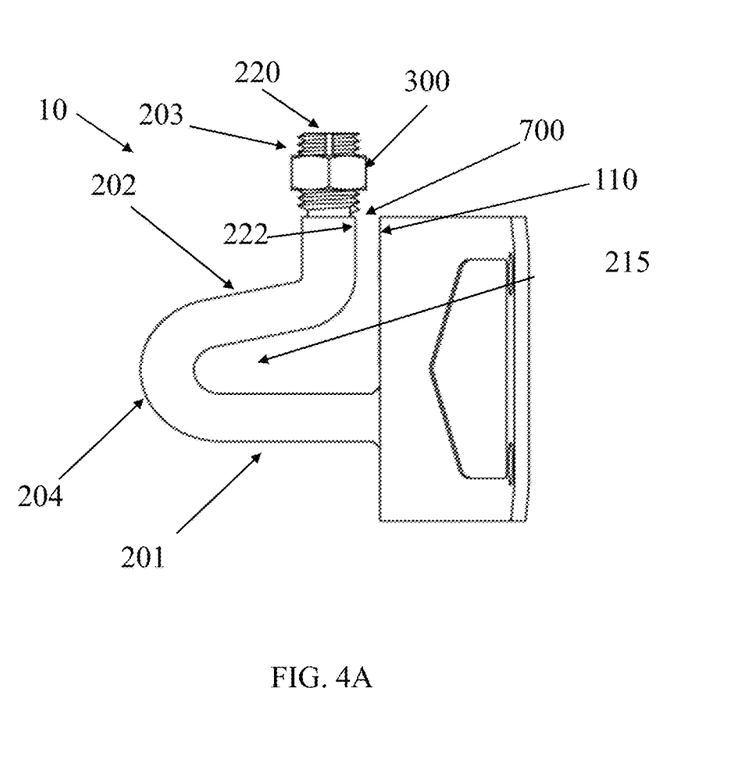
FIG. 4A is a side view of the bracket device of FIG. 1 with the locking nut in an unlocked position.
Figure 4B:
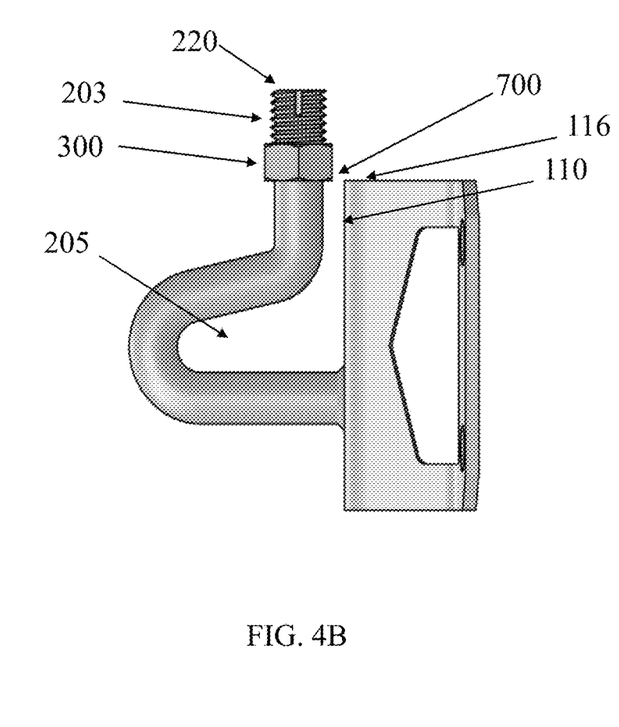
FIG. 4B is a side view of the bracket device of FIG. 1 with the locking nut in a locked position.
Figure 5A:
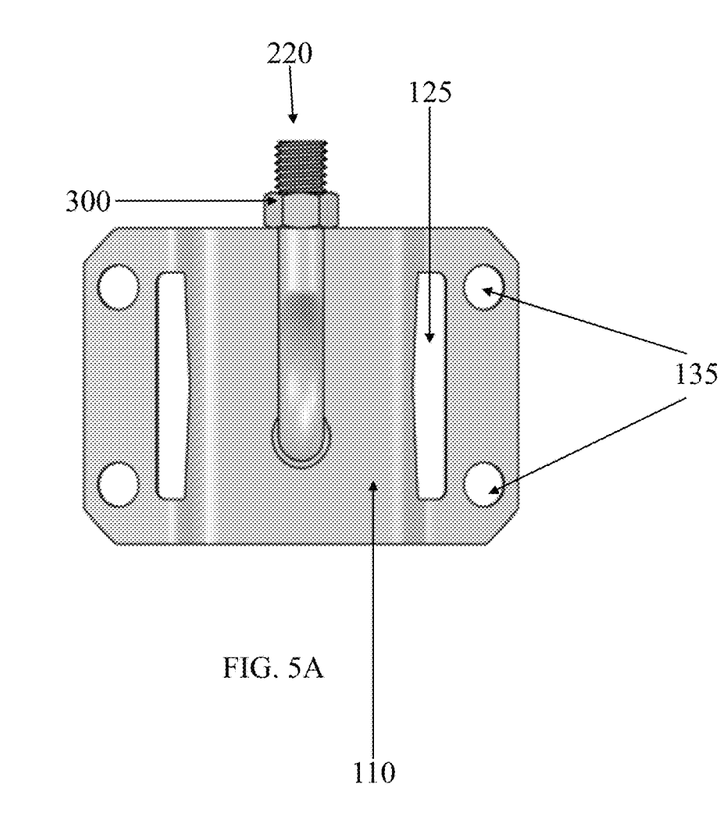
FIG. 5A is a front view of the bracket device of FIG. 1.
Figure 5B:
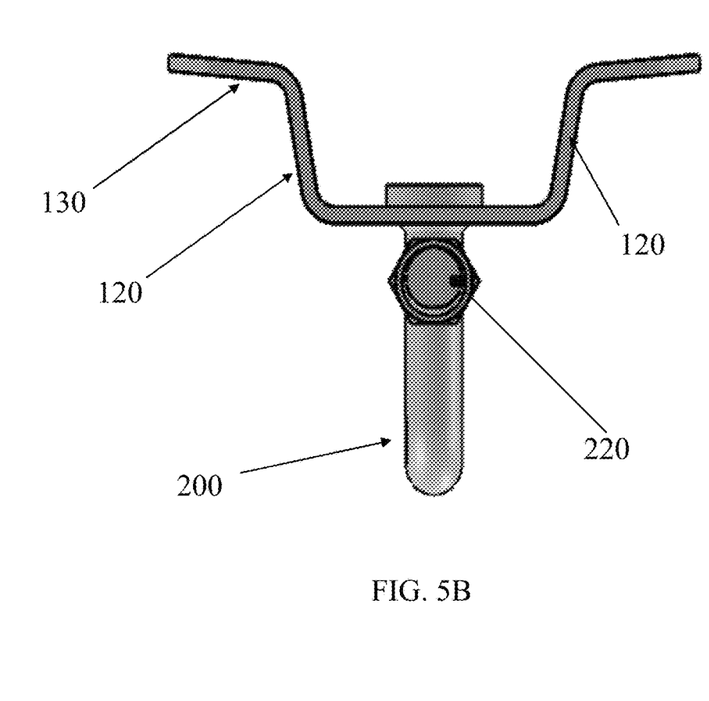
FIG. 5B is a top view of the bracket device of FIG. 1.

With reference to FIG. 2, the bracket device 10 further includes a retention hook 200 with a first end 210 coupled to the surface 110 of the base 100. As discussed further herein, the first end 210 can be coupled to the base using any suitable method. For example, the retention hook 200 can be welded to the base 100. Additionally, or alternatively, and as embodied herein, the retention hook 200 can be secured to the base 100 using a rivet 140. Alternatively, and in accordance with the disclosed subject matter, the base 100 and the retention hook 200 can be monolithic and made of a single piece of material, such as cast from a mold. As best shown in FIGS. 4A and 4B, the retention hook 200 further includes a second end 220 disposed at a predetermined distance from the surface 110 to define a gap 700 therebetween having a width, as further discussed herein. A retention region 205 is defined between the first end 210 and the second end 220 of the retention hook 200. As depicted in FIG. 1, the retention region is configured to retain a wire, such as a bail wire 512 of a drop wire clamp 500. While reference is made herein to the exemplary embodiments of FIG. 1 and FIG. 6, which depict the bracket device 10 retaining a bail wire 512 of a drop wire clamp 500, the bracket device 10 can be used with any suitable wire in accordance with the disclosed subject matter. For purpose of example, and not limitation, the bracket device 10 can be used with utility cables, including fiber optic utility cables, which can be retained by the retention region 205 directly or with the use of a drop wire clamp 500, as further discussed herein.

FIG. 4A depicts the bracket device of FIG. 1 with locking nut 300 in an unlocked position to permit a wire to enter the retention region 205. In accordance with the disclosed subject matter, the second end 220 of the retention hook 200 is disposed at a predetermined distance from the surface 110 of bracket 100 to define a gap 700 between the inner surface 222 of the second end 220 and the surface 110 of base. The predetermined distance between the inner surface 222 of the second end 220 and the bracket surface 110 can be any suitable distance and can be selected to achieve a gap width which corresponds with the properties of the wire 512 to be retained by the retention hook. For example, the wire to be retained can have a gauge or diameter, and the predetermined distance can be selected such that the distance is greater than the gauge of the wire to be retained. For purpose of example, and not limitation, the predetermined distance can be between approximately 100 mil to approximately 200 mil.

Further referencing FIGS. 4A and 4B, and as embodied herein, the retention hook 200 can have a first segment 201 extending from the surface 110, and a second segment 202 disposed at an angle to the first segment 201. The angle 215 between the first segment 201 and the second segment 202 can be any suitable angle depending on the desired shape and dimensions of the retention region 205. For purpose of example, and not limitation, the angle 215 can be between approximately 15 degrees and approximately 90 degrees. Additionally, or alternatively, and as further embodied herein, the retention hook 200 can have a curved portion 204 between the first segment 201 and the second segment 202. The first segment 201 and the second segment 202, along with the curved portion 204 if provided, can be monolithic with each other.

Further referencing FIG. 4A, the retention hook 200 can include a third segment 203 extending between the second segment 202 and the second end 220, which can also be monolithic with the second segment 202. The third segment can have any suitable length dimension. In accordance with the disclosed subject matter, and as embodied herein, the third segment 203 can extend parallel to the surface 110 of the base 100. The bracket device 10 can also be configured such that the third segment 203 extends parallel to the mounting surface 800 of the structure to which the bracket device 10 is secured. The orientation of the third segment with respect to the base surface 110 and the mounting surface 800 can make it easier to transition the locking nut 300 between the unlocked position and the locked position. For example, the orientation of the third segment can make it easier for a user to place a wrench or other tool on the locking nut 300 to transition the locking nut between an unlocked position and a locked position. As will be understood by those of skill in the art, the retention hook can have any shape suitable for retaining a wire in the retention region. Furthermore, while the bracket device 10 of the disclosed subject matter is depicted with the second end 202 oriented upwards, it is understood that the second end 202 can be oriented in any direction in accordance with the disclosed subject matter, including downwards.

As embodied herein, the retention hook 200 can have any suitable size and dimensions and can be made out of any suitable material, as discussed further herein. For example, the dimensions and materials of the retention hook 200 can be selected such that the device 10 can accommodate the necessary weight and/or tension of the wire to be retained. For purpose of example, and not limitation, and as embodied herein, the retention hook can be generally tubular and have a generally circular shape in cross-section. For purpose of example, and not limitation, the retention hook can have a diameter of between approximately 200 mil and 500 mil in a tubular configuration. Additionally, or alternatively, and as further embodied herein, the dimensions and shape of the retention hook can be selected such that the second end 202 of the retention hook 200 extends beyond an outer edge 116 of the base surface 110.

As referenced above, the bracket device 10 further includes a locking nut 300 that is cooperatively coupled with the second end 220 of the retention hook 200 and adapted to or able to move between an unlocked position and a locked position. As embodied herein, when the locking nut 300 is in an unlocked position, a wire, such as a bail wire 512 of a drop wire clamp 500, can be inserted into the retention region 205 by passing the wire 512 through gap 700 to enter the retention region 205. For purpose of example, the wire 512 can have a gauge, or diameter such that the predetermined distance defining the width of gap 700 can be greater than the gauge of the wire to permit the wire to pass through the gap when the locking nut 300 is in the unlocked position.

As further embodied herein, the locking nut 300 can be moved or transitioned between an unlocked position and a locked position to reduce a width of the gap 700 to allow the wire 512 to be retained by the retention hook 200 in the retention region 205. FIG. 4B depicts the locking nut 300 in a locked position such that the width of the gap 700 is reduced. When the locking nut 300 is in the locked position, the width of the gap 700 is less than the gauge of the wire 512 such that the wire is retained in the retention region 205 by the reduction of the gap width. The dimensions of the locking nut 300 can be selected to complement and reduce the dimension of the predetermined distance defining the gap 700 when the locking nut is in the locked position. As such, the dimensions of the locking nut 300 can be selected such that a wire inserted into the retention region is removable through the gap when the locking nut is in the unlocked position. For purpose of example, and not limitation, when a bracket is constructed for use with a drop wire clamp having a bail wire gauge of approximately 40 mil to approximately 200 mil, the width of the gap 700 can be between approximately 40 mil to approximately 200 mil when the locking nut 300 is in the unlocked position, and the width of the gap can be reduced to between approximately 20 mil to approximately 180 mil when the locking nut is in the locked position. As will be understood by those of skill in the art, larger or smaller configurations of bracket device 10 are envisioned within the scope of the disclosed subject matter. Additionally, or alternatively, and as embodied herein, the locking nut 300 can be disposed distal of an outer edge 116 of the surface 110 when the locking nut 300 is in the unlocked position, and the locking nut 300 can be disposed proximate the outer edge 116 when the locking nut is in the locked position.

The locking nut 300 can be cooperatively coupled to the second end 220 of the retention hook using any suitable engagement. For purpose of example, and not limitation, and as embodied herein, the second end 220 can include a threaded configuration, and the locking nut 300 can engage with the threads of the second end. Alternate engagement configurations are further contemplated herein as known in the art, such as but not limited to groove/ridge configurations. Additionally, or alternatively, and in accordance with the disclosed subject matter, the locking nut can be removeable from the bracket device 10. Alternatively, and accordance with another aspect of the disclosed subject matter, the locking nut 300 can be secured with the second end 220 to prevent disassembly of the locking nut 300 from the bracket device 10. For purpose of example, and not limitation, threads of second end 220 can be staked or crimped to prevent locking nut 300 from being disassembled. Such configurations can, for example, prevent unwanted dropping or separation of the locking nut 300 during installation of bracket device 10. Additionally, a cap can additionally fit about the nut and the second end 220 for further securement. Nylon patches can further be applied to the second end for further securement.

As discussed above, the bracket device 10 can be used with any suitable wire in accordance with the disclosed subject matter. For purpose of example, and not limitation, the bracket device 10 can be used with wires such as utility cables, including fiber optic utility cables, which can be retained by the retention region 205 directly or with the use of a drop wire clamp 500. Suitable drop wire clamps for use with bracket device 10 are known in the art and, for purpose of example, can include those disclosed in U.S. Pat. Nos. 8,517,317 and 6,581,251, the disclosures of which are herein incorporated by reference in their entireties. Drop wire clamps commonly include a clamping means to secure a wire within the drop wire clamp at a position between or intermediate to the ends of the wire. With reference to FIG. 1 and FIG. 6, drop wire clamps can include a tail wire 510 which can further include a loop, or bail, 512.

In accordance with the disclosed subject matter, bracket device 10 can be used in combination with a drop wire clamp to secure a wire to a structure. For example, a wire, such as a fiber optic cable or telephone line, can be secured in drop wire clamp 500, and the bail or loop 512 of the drop wire clamp 500 can be inserted into the retention region 205 when the locking nut 300 is in an unlocked position. The bail wire 512 can have a gauge or diameter, and the predetermined distance and width of gap 700 can be configured to permit the wire 512 to enter the retention region 205. After the bail wire 512 is inserted in the retention region 205, the locking nut 300 can be transitioned from the unlocked position to the locked position to retain the wire 512 in the retention region 205. The width of gap 700 can be reduced when the locking nut 300 is in the locked position such that width of the gap 700 is less than the gauge of the wire 512 when the locking nut is in the locked position.

Additionally, or alternatively, and in accordance with another aspect of the disclosed subject matter, the bracket device 10 can be used to secure wires without the use of a drop wire clamp. For purpose of example, and not limitation, a loop can be formed in a wire directly, and the loop can be retained in the retention region 205. In accordance with another aspect of the disclosed subject matter, an intermediate portion of a wire can be retained in the retention region.

In accordance with the embodiments of the subject matter previously described, the device can be made out of a plurality of suitable materials. For instance, the device can comprise any suitable material of construction such as, but not limited to, metals, such as galvanized steel, stainless steel and aluminum, or suitable plastics. In one embodiment, the device comprises a weather resistant and ultraviolet resistant material. Although the device as described herein references several components and features, it is understood that the device can be a monolithic, one-piece device. The device can be manufactured as a solid piece or as a hollow unit. Alternatively, and as embodied herein the device can be welded together from one or more pieces to form a monolithic device. The device can be manufactured in a number of suitable manners, such as by stamping, forging, extruding, molding or any other suitable method of manufacture. According to one aspect of the disclosed subject matter, the materials and dimensions of the bracket device can be selected such that the bracket device supports at least 1,000 pounds of tension.

In accordance with another aspect of the disclosed subject matter, a method of securing a wire 512 to a structure using a bracket device 10 of the disclosed subject matter is provided. The method includes attaching the bracket device 10 to a structure, and cooperatively coupling a locking nut 300 to the second end 220 of the retention hook 200 in an unlocked position. The method further includes inserting a wire 512 having a gauge into the retention region 205 with the locking nut 300 in the unlocked position and transitioning the locking nut 300 from the unlocked position to the locked position to retain the wire 512 in the retention region 205. The width of the gap 700 is less than the gauge of the wire 512 when the locking nut 300 is in the locked position.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed. It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A bracket device to secure a tail wire of a drop wire clamp to a structure comprising:
 a base having a surface;
 a retention hook having a first end, a second end, and a retention region defined between the first end and the second end, wherein the first end is coupled to the surface and the second end extends upwards away from the first end, wherein the second end is disposed a predetermined distance from the surface to define a gap therebetween having a width, wherein the base and retention hook are a monolithic unit; and
 a locking nut cooperatively coupled to the second end of the retention hook and adapted to move between an unlocked position to permit a wire to enter the retention region and a locked position wherein a wire is retained by the retention hook in the retention region by a reduction of the gap width.

2. The bracket device of claim 1, wherein the surface extends between a first base edge and a base outer edge and a base height is defined between the first base edge and the base outer edge, and wherein a retention hook height is defined between the first base edge and the second end of the retention hook, wherein the retention hook height is larger than the base height and the second end extends beyond the base outer edge.

3. The bracket device of claim 1, wherein the locking nut is removable.

4. The bracket device of claim 1, wherein the locking nut is secured with the second end to prevent disassembly of the locking nut from the device.

5. The bracket device of claim 1, wherein the second end has a threaded configuration.

6. The bracket device of claim 1, wherein the wire comprises at least one of a telecommunications cable, a fiber optic cable, or the tail wire of the drop wire clamp.

7. The bracket device of claim 1, wherein the predetermined distance is between approximately 100 mil to approximately 200 mil, and wherein the gap width is between approximately 20 mil to approximately 180 mil when the locking nut is in the locked position.

8. The bracket device of claim 1, wherein the base defines at least one hole to receive an implement including at least one of a screw, nail, anchor, rivet, or a bolt to secure the base to a structure.

9. The bracket device of claim 1, wherein the base includes opposing legs each defining a slot therein, the respective slots configured to receive a fastener to secure the base to the structure.

10. The bracket device of claim 1, wherein the device includes at least one of galvanized steel, stainless steel, aluminum, or plastic.

11. The bracket device of claim 1, wherein the retention hook supports at least 1,000 pounds of tension.

12. The bracket device of claim 1, wherein the gap is maintained between the second end and the surface in the locked position.

13. The bracket device of claim 1, wherein the retention hook includes a first segment extending from the surface, and a second segment disposed at an angle to the first segment.

14. The bracket device of claim 13, wherein the angle is between approximately 15 degrees and approximately 90 degrees.

15. The bracket device of claim 13, wherein the retention hook includes a curved portion between the first segment and the second segment.

16. The bracket device of claim 13, wherein the retention hook includes a third segment extending between the second segment and the second end, the third segment having a length dimension.

17. The bracket device of claim 16, wherein the third segment extends parallel to the surface.

18. The bracket device of claim 16, wherein the third segment extends parallel to a mounting surface of the structure.

19. A method for securing a tail wire of a drop wire clamp to a structure with a bracket device including a base having a surface, a retention hook having a first end, a second end, and a retention region defined between the first end and the second end, wherein the first end is coupled to the surface and the second end extends upwards away from the first end, wherein the second end is disposed at a predetermined distance from the surface to define a gap having a width therebetween, and wherein the base and retention hook are a monolithic unit, comprising:
attaching the bracket device to a structure, and
cooperatively coupling a locking nut to the second end of the retention hook in an unlocked position;
inserting a wire having a gauge into the retention region with the locking nut in the unlocked position; and
transitioning the locking nut from the unlocked position to the locked position to retain the wire in the retention region, wherein the width of the gap is less than the gauge of the wire when the locking nut is in the locked position.

20. The method of claim 19, further comprising securing a cable in a drop wire clamp, and wherein the wire includes the tail wire of the drop wire clamp.

* * * * *